United States Patent Office.

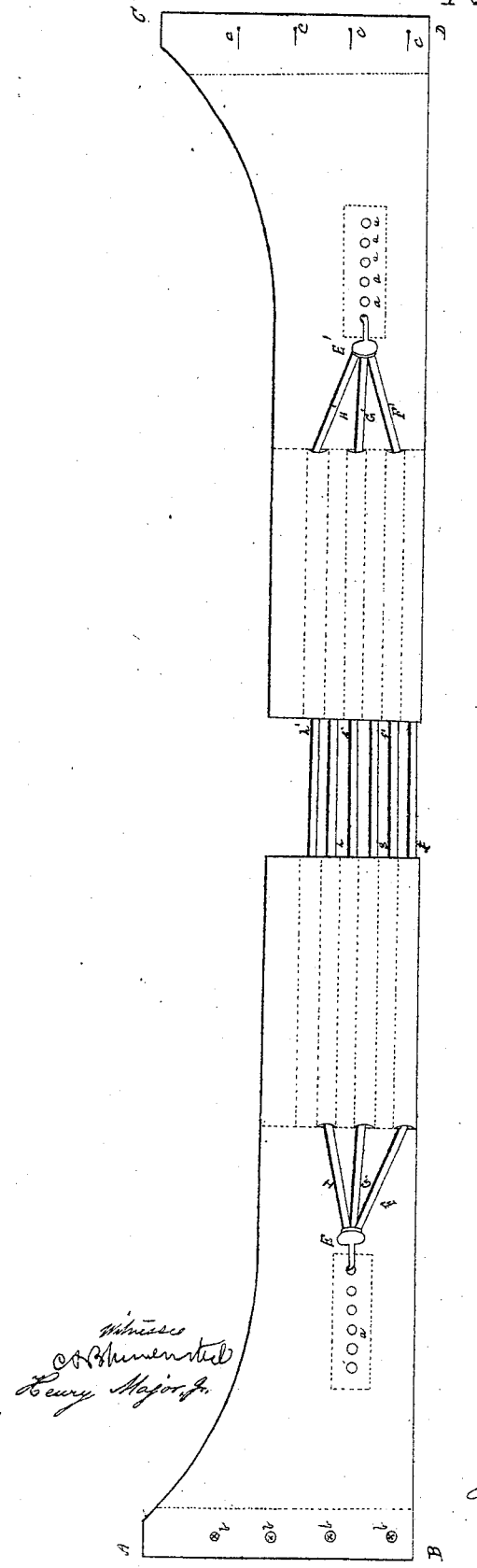

ZADIG WOLFSBRUCK, OF NEW YORK, N. Y.

Letters Patent No. 76,871, dated April 14, 1868.

---

IMPROVEMENT IN WAISTBANDS FOR WEARING-APPAREL.

---

*The Schedule referred to in these Letters Patent and making part of the same.*

---

TO ALL WHOM IT MAY CONCERN:

Be it known that I, ZADIG WOLFSBRUCK, of the city and county and State of New York, have invented a new and improved Band for Drawers, for the purpose of making every pair of drawers fit the wearer, no matter what may be his size. The following I declare to be a full and exact description thereof, reference being had to the accompanying drawings, and to the letters of reference marked thereon.

The nature of my invention consists in providing a band to the drawers, which band is provided with strings and a hook attached to each end, so that by drawing out or letting in the strings, the band will fit around any wearer's hips. The hooks are fastened into eyelets, so as to keep the strings at their proper tension.

The great trouble has been heretofore, that drawers could not be made to fit comfortably around the waist. They were sometimes too loose or too tight for the waist, and unless they, by washing, &c., contracted and became too small for the wearer, they were too large, and had to be lapped over and fastened with pins or a string, thus setting uncomfortably on the wearer.

To enable others skilled in the art to make and use my invention, I will proceed to describe its construction and practice.

A B C D comprises the band. The curve A C is fastened and sewed on to the drawers. $b$ are the buttons, and $c$ the holes; E G H, $f g h$, and F' G' H', $f' g' h'$, are strings going through the band, and which can be pulled together by pulling at the hooks E and E' in opposite directions. As soon as the band is thus drawn together enough around the waist, the hooks E and E' are fastened into any of the eyelets $a$ or $b$ around the side or front of the person, thus keeping the band in its proper place tightly around the waist, and preventing the drawers from setting loosely or falling down. When the wearer wishes to take them off his person, he merely takes the hooks out of the eyelets, and draws the waist out.

The band and strings can be made of any material whatever, linen, silk, muslin, &c.

What I claim as my invention, and desire to secure by Letters Patent, is—

The waistband for drawers, provided with the adjustable fastening-device, consisting of the tapes F F', G G', H H', passing through suitable pockets therein, and fastened thereto by means of hooks E E' and eyes $a\ a\ a$, as described heretofore.

Dated, New York, July 10, 1867.

ZA. WOLFSBRUCK.

Witnesses:
A. BLUMENSTIEL,
A. S. COHEN.